United States Patent Office 2,775,920
Patented Jan. 1, 1957

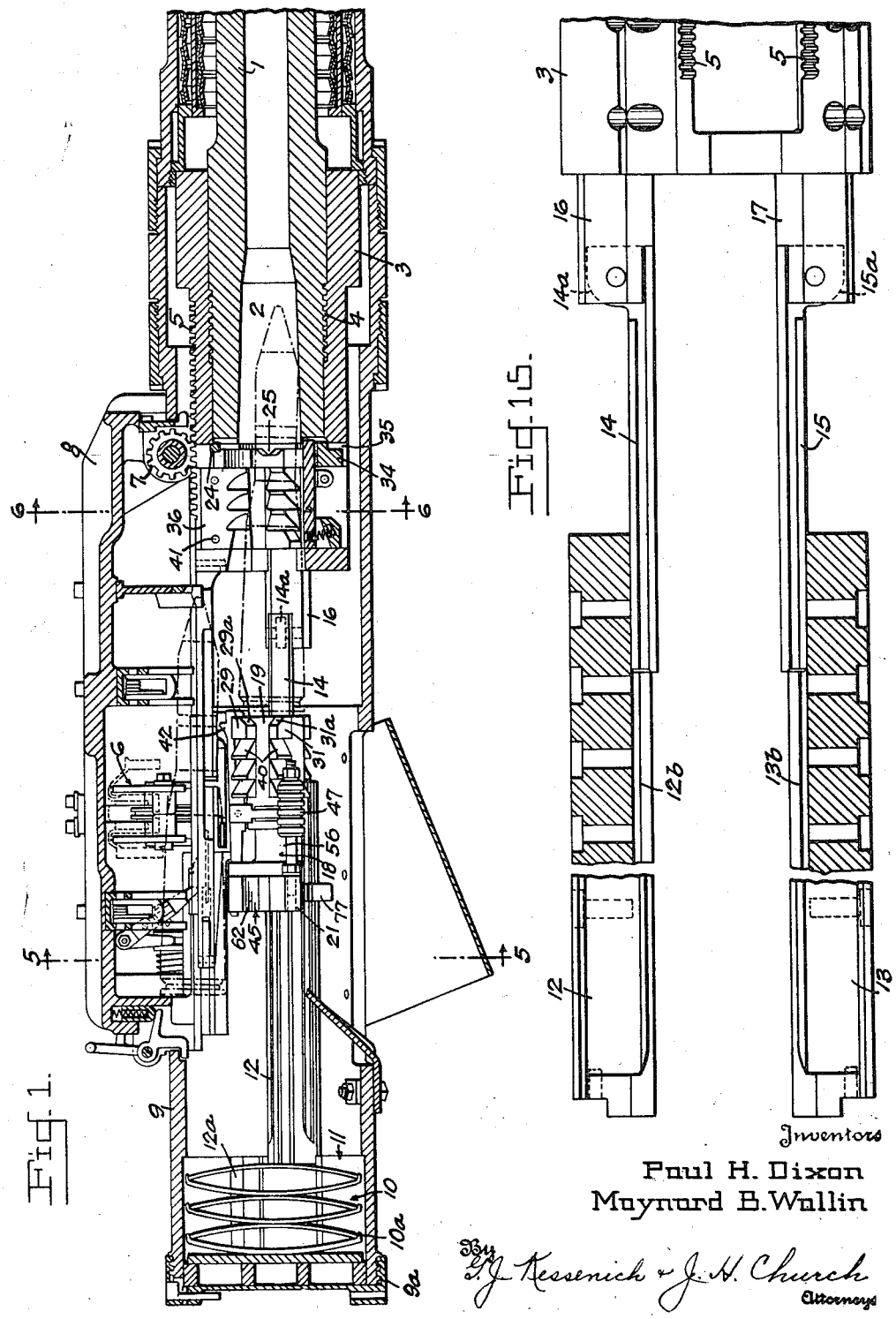

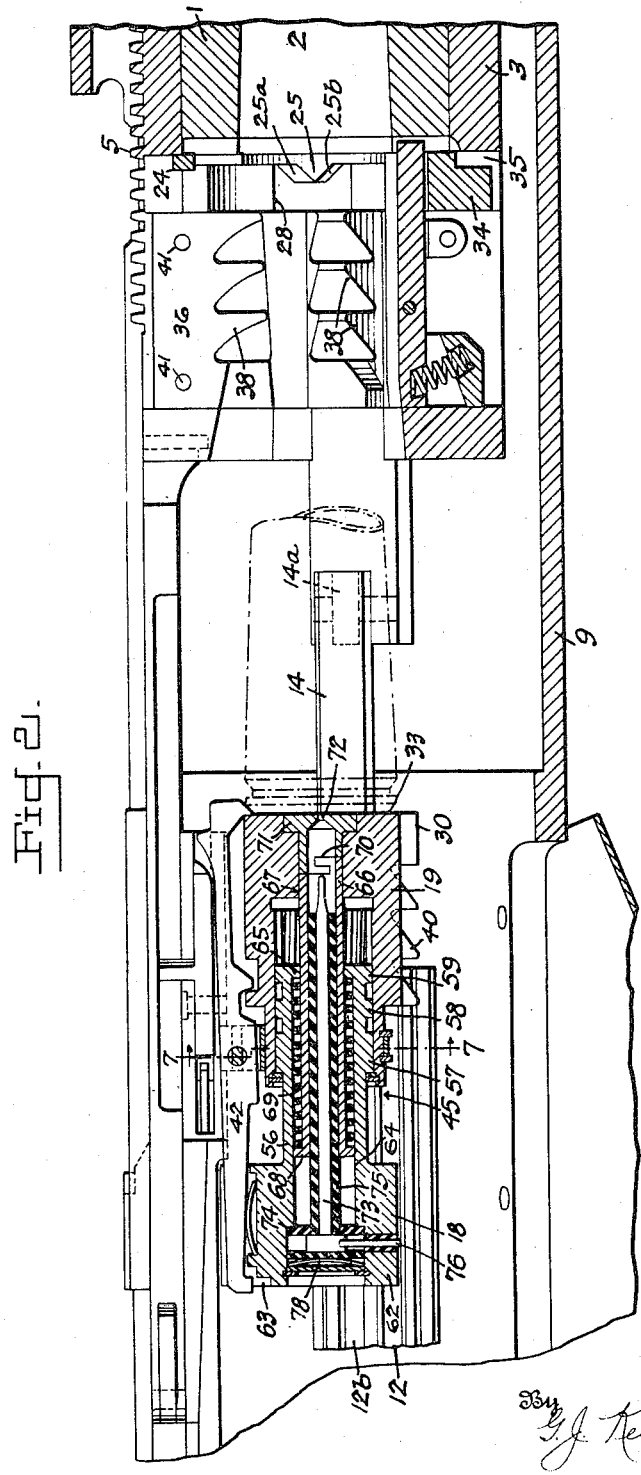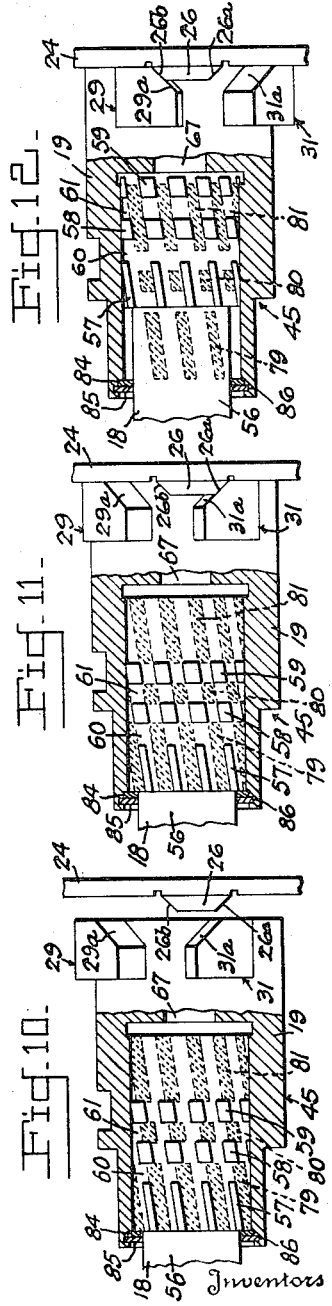
Inventors
Paul H. Dixon
Maynard B. Wallin

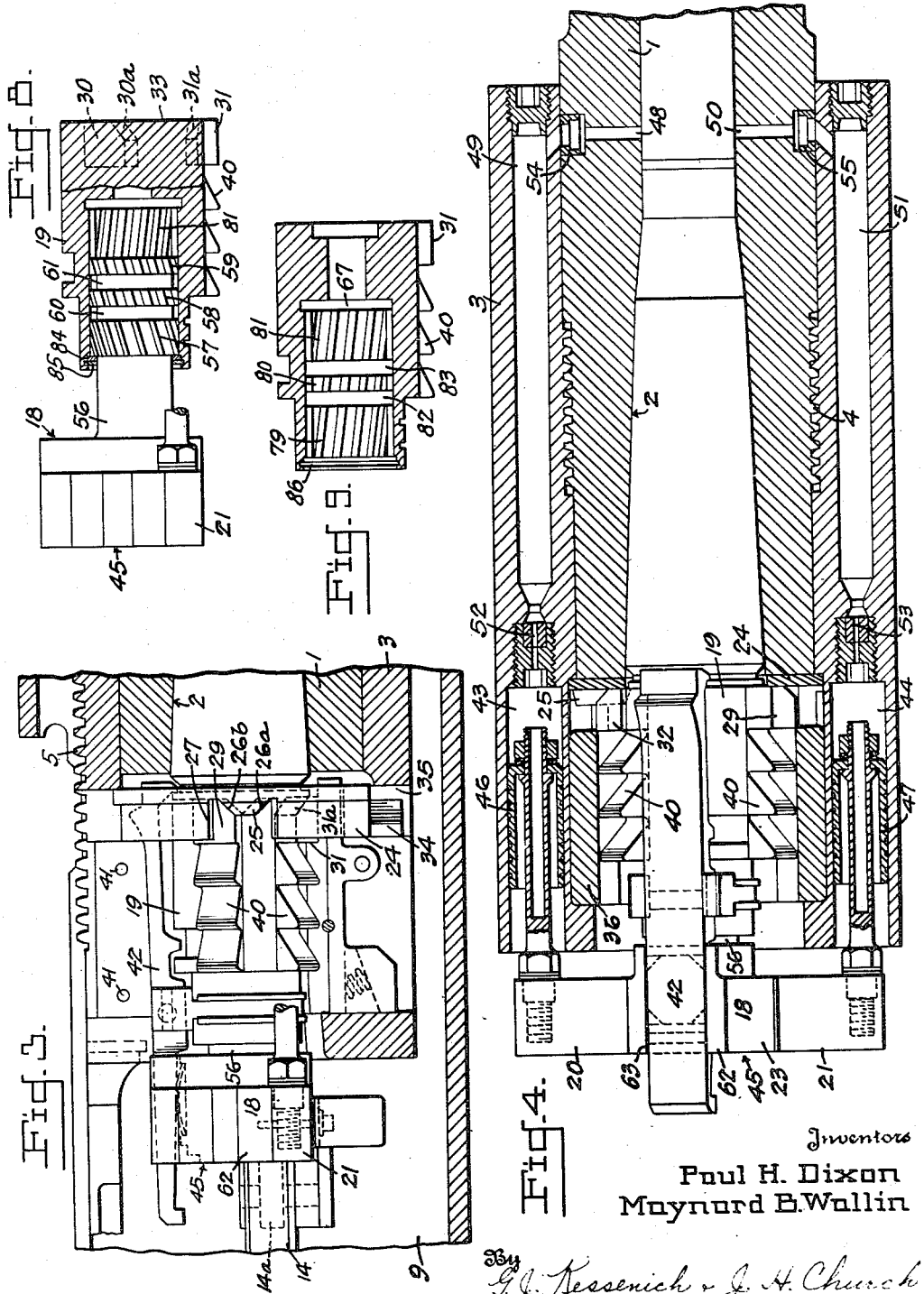

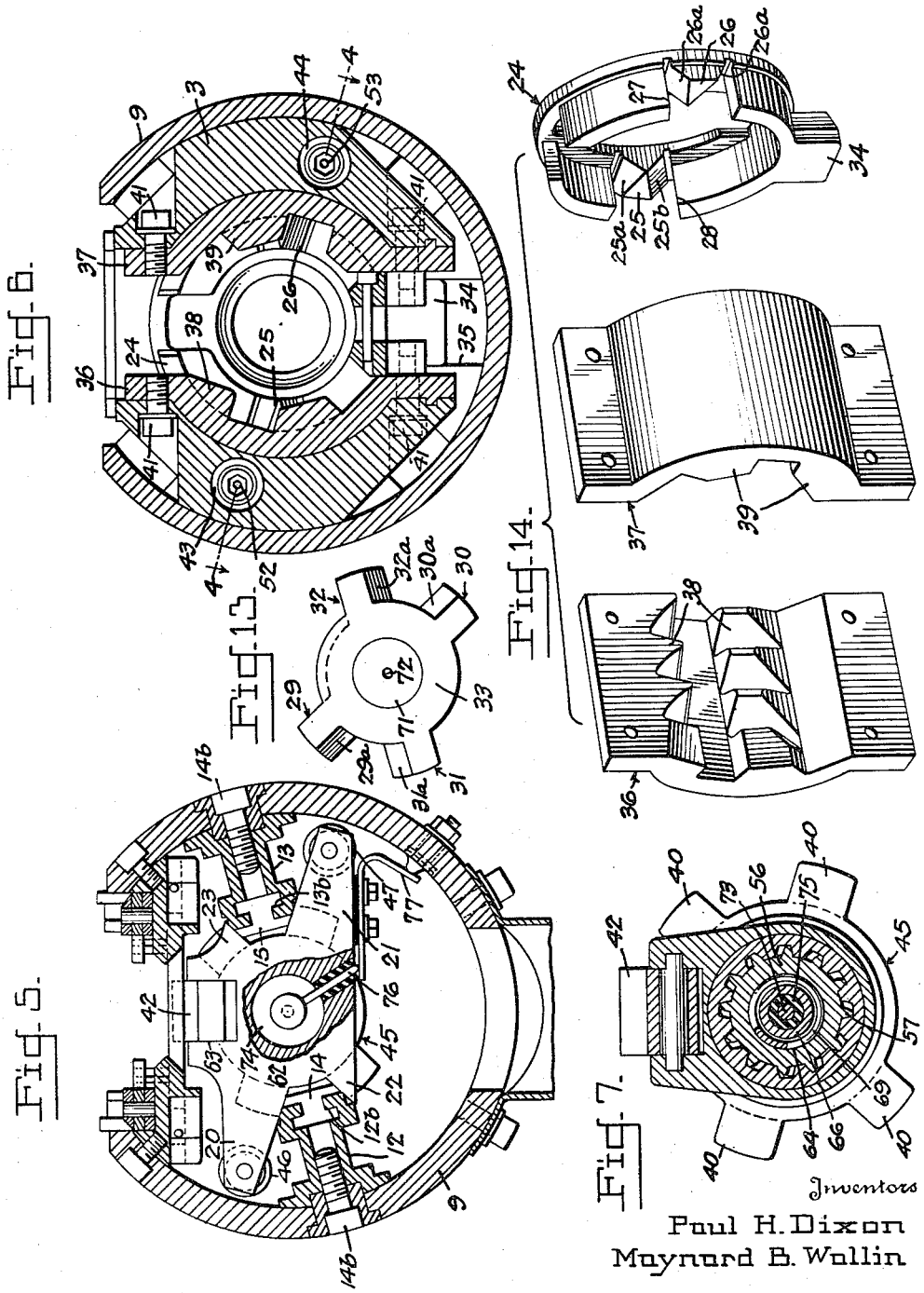

2,775,920
BOLT SPLINE

Paul H. Dixon and Maynard B. Wallin, Rockford, Ill., assignors to the United States of America as represented by the Secretary of the Army Application May 1, 1950, Serial No. 159,336

4 Claims. (Cl. 89—188)

This invention relates to automatic aircraft cannon and more particularly to shuttle type bolt mechanism for said cannon.

An object of the invention is a gas operated bolt mechanism that results in a reduction of the overall length of the cannon.

Another object of the invention is a shuttle type, gas operated bolt that will remain positively locked until the peak gas pressure in the chamber has diminished.

Another object of the invention is a shuttle type bolt utilizing the gases of the fired round for unlocking the bolt.

Another object of the invention is a shuttle type bolt where the body of the bolt is held against rotation and the head of the bolt is rotated to lock and unlock the bolt during counterrecoil and recoil.

Another object of the invention is a shuttle type bolt mechanism which prevents unlocking of the bolt until the gas pressure in the gun tube has dropped to a safe value and which permits use of the residual gas pressure in the tube after unlocking the bolt to additionally accelerate the bolt.

The specific nature of the invention as well as other objects and advantages thereof will clearly appear from the following description and drawings in which:

Figure 1 is a longitudinal sectional view of the cannon, particularly showing the bolt, buffer and locking mechanism.

Figure 2 is a longitudinal sectional view showing the bolt in section and its cooperating locking means in the breech ring.

Figure 3 is an enlarged longitudinal section showing the bolt in locked position.

Figure 4 is an enlarged horizontal section taken along line 4—4 of Figure 6, showing the bolt in locked position, and the bolt pistons.

Figure 5 is a section taken along line 5—5 of Figure 1.

Figure 6 is a section taken along line 6—6 of Figure 1.

Figure 7 is a section taken through the bolt along line 7—7 in Figure 2.

Figure 8 is an elevational view of the bolt assembly with the bolt head in section showing the helical splines of the bolt body.

Figure 9 is a sectional view of the bolt head showing the helical splines on the interior of the bolt head.

Figure 10 is a diagram showing the relationship of the bolt head to the stop ring, and the relationship of helical splines when the bolt members are in extended position.

Figure 11 is a diagram similar to that shown in Figure 10, but with the bolt head rotated 6°.

Figure 12 is a diagram similar to that shown in Figure 10, but with the head rotated 30° and fully locked in the breech inserts.

Figure 13 is a front view of the bolt head.

Figure 14 is an exploded view showing the breech inserts and bolt stop ring in perspective.

Figure 15 is a plan view showing the telescoping rails assembled to the breech ring.

Referring more particularly to the drawings, there is shown in Figure 1 a gun barrel 1 having a chamber 2, and provided with a breech ring 3 fixed to the barrel as at 4. The breech ring has formed in its surface a rack 5 which upon recoil winds the spring motor of the feed mechanism 6 through the pinions 7. The feed mechanism 6 is contained in the housing 8 which is releasably fixed in the top of the receiver 9. Assembled in the rearmost part of the receiver is a bolt buffer assembly 10. This buffer is not designed to dissipate the energy of the recoiling bolt as the name implies, but is designed to return as much of the energy as possible to the shuttle bolt 45. The bolt buffer is a simple unit of six leaf springs 10a. The buffer assembly is secured into place by the receiver end cap 9a, which screws on the end of the receiver and is held against unloosening by a conventional spring loaded lock, not shown. The six springs are assembled in pairs of two each. Each pair is meshed together under load by formed ends on one spring in each pair. The pair of rear leaf springs are thicker and therefore have a stiffer spring scale. This is to keep the variable amount of bolt travel within closer limits. The six springs are confined in a package comprising mainly two identical guides 11, only one of which is shown, arranged so that the springs will stay in proper alignment during the buffing stroke. These guides also serve to hold the bolt body 18 against rotation, when the bolt assembly extends beyond the horizontal slide rail assemblies 12 and 13 during the buffing stroke. The piston supporting arms 20 and 21 are received by tracks 12a and 13a, formed in the guides, during this buffer compression and thereby prevent rotation of the bolt body. Horizontal slide rail assemblies 12 and 13 extending from the buffer assembly to a point intermediate the length of the receiver are fastened to the receiver walls by means of machine screws 14b and are provided with a T-shaped groove 12b and 13b respectively. Slidably received in the grooves 12b and 13b are H-shaped telescoping rails 14 and 15 having their ends 14a and 15a fixed in the breech rings slotted lugs 16 and 17 respectively. The shuttle bolt comprises a non-rotating body 18 and a rotating bolt head 19. The rear of the bolt body is formed with diametrically opposed piston supporting arms 20 and 21 and two diametrically opposed arms 22 and 23, angularly spaced from the piston supporting arms. As best shown in Figure 5 the piston supporting arm 20 and arms 22 slidably embrace the rails 12 and 14, and the piston supporting arm 21 and arm 23 likewise embrace the rails 13 and 15 during recoil and counterrecoil movement of the bolt and prevents rotation of the bolt body. Positioned within the breech ring adjacent the chamber end of the gun barrel is a stop ring 24 having cams 25 and 26 in slots 27 and 28 for cooperation with cams 29 and 30 and cams 31 and 32 extending radially of the bolt head face 33 to convert the longitudinal momentum of the bolt head into rotational energy, see Figures 10, 11 and 12 and 14. The stop ring is held against rotatory motion by means of a tongue 34 fitted in slot 35 formed in the breech ring. The stop ring is also slotted diametrically opposite the tongue to receive the forward end of the extractor 42 mounted on the bolt head, as shown in Figure 5. Two breech ring inserts 36 and 37 are provided with internal interrupted threads 38 and 39 respectively, for locking engagement with the interrupted threads 40 formed on the outside of the bolt head. The breech ring inserts abut the stop ring and prevent longitudinal movement of the stop ring and are fastened to the interior surface of the breech ring by means of machine screws 41. The breech ring is provided with piston chambers 43 and 44 for receiving pistons 46 and 47, respectively, affixed to the bolt body as best shown in Figure 4. The powder gases in the high pressure area of gun tube are bled through passages 48 in the gun tubes and 49 in the breech ring, and likewise through passages 50 and 51 to act against the pistons 46 and 47 to start unlocking of the bolt. Reference characters 52 and 53 indicate restrictions in the gas passages 49 and 50 for controlling the pressure against the pistons. Reference numerals 54 and 55 indicate the obturating bushings in gas passages 48 and 50 respectively. The bolt body 18 comprises a cylindrical portion 56 having formed thereon at its forward end three groups of helical splines 57, 58 and 59. Splines 57 and 58 are spaced from each other by means of an annular groove 60, and splines 58 and 59 spaced from each other by means of an annular groove 61, which interrupt the teeth as shown in Figure 8. The teeth of the rear most splines 57 are but one half the thickness of the teeth of splines 58 and 59. The rear end of the cylindrical portion 56 has integral therewith a cross member generally indicated by 62 having formed therein the piston supporting arms 20 and 21 and the arms 22 and 23 hereinbefore described. The top side of the cross member is grooved as at 63 to accommodate the extractor. The bolt body is longitudinally bored, as indicated by reference numeral 64. The forward end of the bore being reduced in diameter and forming an annular flange 65. A bolt head sleeve 66 having one end fixed in the longitudinal bore 67 projects into the bore 64 and has its opposite end provided with a flange 68. A helical spring 69 mounted on the sleeve 66 is confined between the flanges 68 and 65 and thrusts against the bolt head sleeve to retain the bolt in locked position. The sleeve is secured by a step cut 70 in the sleeve support bushing 71 which has a central perforation 72 providing a passage for the electric firing pin 73. The firing pin is centrally supported in the rear portion of the body by means of an insulation disk 74 and longitudinally by a sleeve of insulation 75 reciprocal in the bolt head sleeve 66. An insulated lead 76 in the cross member connects the electric firing pin with a contact member 77 mounted on one of the piston bearing arms as best shown in Figure 5. The electric firing pin is spring loaded to assure contact with primers of varying depth by means of a spring 78 fixed in the bore 64 and bearing against the insulation disk 74 which supports the head of the firing pin. Figure 9 shows three groups of helical splines 79, 80 and 81 formed in the wall of the longitudinal bore 67 of the bolt head. The splines 79 and 80 are separated by groove 82 and splines 80 and 81 are separated by groove 83 for coaction with the splines and grooves formed on the bolt body. Fixed in the rearmost part of the bolt head bore 67 adjacent the splines 79 is a spline stop ring 84 held in position by a snap ring 85 in groove 86.

It will be assumed that the bolt is in the battery or closed position. When a round is fired the gases are bled from the chamber through passages in the gun barrel and breech ring to the piston chambers and applied to the pistons which exert a force upon the bolt body, which is longitudinally slidable on the slider rails and which is held against rotational movement by the arms formed in the cross member of the bolt body and embracing the slider rails, and starts to unlock the bolt. This causes a lengthwise displacement between the bolt body and bolt head and the spline connections between the bolt body and head act to rotate the head and disengage the cams on the bolt head and stop ring and the interrupted threads on the bolt head and breech ring inserts. At the completion of the displacement the ends of the rear spline 57 on the bolt body bear against the spline stop ring; the bolt head has rotated 24 degrees and the splines 58 and 59 on the bolt body are in line with the annular grooves 82 and 83 on the bolt head, see Figure 11. The bolt head momentum completes the last 6 degrees of rotation. In this 6 degrees, the splines 58 and 59 intermesh with the annular grooves 82 and 83 and the splines 81, 59, 80 and 59 are in alignment with each other thereby locking the bolt in its extended position. The helical spring located inside the bolt and thrusting against the bolt head sleeve, retains the bolt in this extension. The rear splines 57 on the bolt body and 79 on the bolt head remain in engagement, see Figure 10. However, the teeth on the rear spline of the bolt body are thinned to one half the normal tooth thickness. This allows for the 6 degrees of bolt head rotation without tooth interference with the rear splines. In the meantime the bolt completes its recoil motion by engaging the buffer which bounces the bolt into counterrecoil motion which is arrested when the bolt head collides with the bolt head stop ring to start the bolt locking motion. The energy required for locking during automatic fire is provided by the kinetic energy in the bolt assembly. This is applied by means of the helical spline connection between the bolt body and bolt head. The bolt's longitudinal momentum is converted into rotational energy by inclined surfaces on the cams in the bolt stop ring. In doing so the bolt head first collides with the bolt stop ring and the cam slopes 31a and 32a on the bolt head engage the cam slopes 25a and 26a on the bolt stop ring. This imparts initial rotation to the bolt head; and causes the bolt head to rotate 6 degrees; thereby unmeshing the splines 58 and 59 with the annular grooves 82 and 83 and positions the splines of the head and body for engagement with each other. The forward momentum of the bolt body then causes the helical splines to rotate the bolt head 24 degrees to complete locking. The interrupted threads or the bolt head and on the breech ring insert are now completely meshed. The bolt head rotation is brought to a stop, at the completion of locking, by the cam slopes 29a and 30a on the bolt head, colliding with the cam slopes 26b and 25b on the bolt stop ring as indicated in Figure 12. This eliminates undesirable stress on the splines.

We claim:

1. In an automatic cannon, a bolt mechanism comprising a two piece bolt slidably mounted on rails positioned in the receiver of said cannon, a breech ring having a portion extending rearwardly of the breech, a bolt stop ring in said breech ring adjacent said breech and restrained against longitudinal movement therein by means of inserts in said breech ring, the inserts being provided with interrupted threads on their inner surfaces for locking engagement with mating threads on said bolt, the wall of said stop ring provided with diametrically opposed slots, each of said slots having a cam formed in the base thereof and extending inwardly of said wall, said bolt comprising a longitudinally bored cylindrical body having arms formed on the rear end of said body, said arms embracing the rails to prevent rotation of said body, groups of helical splines on the periphery of said body, said bolt head comprising a cylindrical body having groups of splines formed in a longitudinal bore thereof and in engagement with said body splines, diametrically opposite pairs of cams on the forward end of said head member, the cams of each of said pairs angularly spaced to straddle one of said cams on said stop ring, interrupted threads on said head member adjacent to and in alignment with the cams formed on said head member, one cam of each pair of cams upon collision of said head member and stop ring engages a cam on said stop ring to initially impart rotation to said head member and align the interrupted teeth of said head and inserts, said body continuing in counterrecoil to further rotate said head and mesh said teeth, said one cam of each pair of cams disengaging its respective stop ring cam, the other of each pair engaging said respective cam to limit the rotation of said head.

2. The invention as set forth in claim 1 wherein the splines on said body are circumferentially disposed and longitudinally spaced by annular grooves forming three groups of splines, the rearmost group of splines being approximately twice as long and one half the thickness of the other groups, said head splines comprising three groups longitudinally spaced along the bore of said head to form intermediate annular grooves, the intermediate grooves of said head splines receiving in alignment with said head splines the said other groups of body splines when said bolt is in extended position, said rearmost body splines contacted by one group of the head splines during recoil to limit the rotation of said head and align the head and body splines, said body and head splines moving out of alignment upon collision of said head and stop ring during counterrecoil movement of the bolt, said body continuing in counterrecoil movement to cause spline action to rotate and lock said head, and means to maintain said bolt in extended position.

3. The invention as set forth in claim 2 wherein said means comprises a sleeve having a substantially closed front flanged end mounted in the face of said head, the body of said sleeve extending in the longitudinal bores of said head and body, a rear flange formed on the opposite end of the sleeve in sliding contact with the wall of said bolt body bore, the bolt body bore terminating at its forward end in an inwardly directed flange, a spring mounted on said sleeve between said rear flange and bolt body flange, said spring maintaining said bolt in extended position and said splines in alignment during recoil and counterrecoil movement of the bolt.

4. In an automatic cannon, a bolt mechanism comprising a two piece bolt comprising a head portion and a body portion slidably mounted in said cannon, a breech ring having a portion extending rearwardly of the breech, a bolt stop ring in said breech ring adjacent said breech and restrained against longitudinal movement therein by means of inserts in said breech ring, said inserts being provided with interrupted threads on their inner surfaces for locking engagement with mating threads on said bolt, the wall of said stop ring provided with diametrically opposed slots, each of said slots having a cam formed in the base thereof and extending inwardly of said wall, helical splines formed on the periphery of said body portion, said bolt head having helical splines formed in a longitudinal bore thereof and in engagement with said body splines, diametrically opposed pairs of cams on said head member and spaced to straddle one of said cams on the said stop ring, one cam of each pair of cams upon collision of said head member and said stop ring engaging a stop ring cam to initially impart rotation to said head member, the said helical body splines circumferentially disposed and longitudinally spaced by annular grooves forming three groups of splines, the rearmost group being substantially twice as long and one-half the thickness of the other groups, the said head splines comprising three groups longitudinally spaced along the bore of said head to form intermediate annular grooves, the intermediate grooves of said head splines receiving in alignment the said other groups of body splines when said bolt is in extended position, the said rearmost body splines engaged by one group of said head splines during recoil motion to limit the rotation of said head and align the head and body splines, said body and head splines moving out of alignment upon collision of said head and stop ring during counterrecoil motion of said bolt, said body continuing in counterrecoil movement to cause spline action to rotate said head.

References Cited in the file of this patent

UNITED STATES PATENTS

| | | |
|---|---|---|
| 516,768 | Teibert | Mar. 20, 1894 |
| 601,177 | Stockett | Mar. 22, 1898 |
| 729,413 | Reifgraber | May 26, 1903 |
| 804,986 | Stamm | Nov. 21, 1905 |
| 991,962 | Eastwick | May 9, 1911 |
| 1,020,849 | Smith et al. | Mar. 19, 1912 |
| 1,291,689 | Sheppard | Jan. 14, 1919 |
| 1,637,233 | Norman | July 26, 1927 |
| 2,494,889 | Maillard | Jan. 17, 1950 |
| 2,501,069 | Maillard | Mar. 21, 1950 |

FOREIGN PATENTS

| | | |
|---|---|---|
| 151,781 | Germany | June 17, 1904 |
| 160,666 | Austria | Oct. 10, 1941 |
| 718,111 | Germany | Mar. 3, 1942 |
| 719,180 | Germany | Apr. 1, 1942 |
| 438,061 | Italy | July 23, 1948 |
| 438,064 | Italy | July 23, 1948 |
| 261,414 | Switzerland | Aug. 16, 1949 |